United States Patent
Gong

(10) Patent No.: US 10,547,567 B2
(45) Date of Patent: Jan. 28, 2020

(54) PACKET FORWARDING

(71) Applicant: New H3C Technologies Co., Ltd, Hangzhou (CN)

(72) Inventor: Yibin Gong, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 56 days.

(21) Appl. No.: 16/071,757

(22) PCT Filed: Mar. 3, 2017

(86) PCT No.: PCT/CN2017/075605
§ 371 (c)(1),
(2) Date: Jul. 20, 2018

(87) PCT Pub. No.: WO2017/185878
PCT Pub. Date: Nov. 2, 2017

(65) Prior Publication Data
US 2019/0036845 A1    Jan. 31, 2019

(30) Foreign Application Priority Data

Apr. 27, 2016    (CN) .......................... 2016 1 0270640

(51) Int. Cl.
*H04L 12/741*    (2013.01)
*H04L 29/12*    (2006.01)
(Continued)

(52) U.S. Cl.
CPC ........ *H04L 49/208* (2013.01); *G06F 9/45558* (2013.01); *H04L 12/46* (2013.01);
(Continued)

(58) Field of Classification Search
None
See application file for complete search history.

(56) References Cited

U.S. PATENT DOCUMENTS 9,331,915 B1    5/2016    Brandwine
9,699,030 B1 *    7/2017    Kumar ................ H04L 41/0853
(Continued)

FOREIGN PATENT DOCUMENTS

CN    104767685    7/2015
CN    106101011    11/2016
(Continued)

OTHER PUBLICATIONS

Office Action issued in Corresponding Chinese Patent Application No. 201610270640, dated May 17, 2019.
(Continued)

*Primary Examiner* — Duc T Duong
(74) *Attorney, Agent, or Firm* — Norton Rose Fulbright US LLP

(57) ABSTRACT

A method and device for forwarding a packet are disclosed. When a first access device connected with a database server is to be configured with a mirror image rule, an SDN controller can transmit a mirror image rule adding message carrying the mirror image rule to the first access device. Where, the mirror image rule comprises an IP address of the database server, a MAC address of a database audit device connected with a second access device and a VXLAN tunnel between the first access device and the second access device. When receiving a database access packet whose destination IP address is an IP address of the database server, the first access device may replace a destination MAC address of a mirror packet for the database access packet with a MAC address of the database audit device according to the mirror image rule and forward the encapsulated VXLAN packet.

12 Claims, 5 Drawing Sheets

(51) Int. Cl.
*H04L 12/931* (2013.01)
*H04L 12/46* (2006.01)
*H04L 29/08* (2006.01)
*H04L 12/26* (2006.01)
*H04L 12/24* (2006.01)
*G06F 9/455* (2018.01)
*H04L 12/935* (2013.01)

(52) U.S. Cl.
CPC ...... *H04L 12/4633* (2013.01); *H04L 12/4641* (2013.01); *H04L 29/08* (2013.01); *H04L 41/0803* (2013.01); *H04L 41/0816* (2013.01); *H04L 43/062* (2013.01); *H04L 43/12* (2013.01); *H04L 45/745* (2013.01); *H04L 49/3009* (2013.01); *H04L 61/6022* (2013.01); *G06F 2009/4557* (2013.01); *H04L 2212/00* (2013.01)

(56) References Cited

U.S. PATENT DOCUMENTS

| 10,033,638 | B1* | 7/2018 | Stark | H04L 69/22 |
| 2012/0072567 | A1 | 3/2012 | Yin et al. | |
| 2015/0063353 | A1* | 3/2015 | Kapadia | H04L 45/745 |
| | | | | 370/392 |
| 2015/0281067 | A1* | 10/2015 | Wu | H04L 61/6022 |
| | | | | 370/392 |
| 2016/0352538 | A1* | 12/2016 | Chiu | H04L 69/325 |
| 2016/0359745 | A1* | 12/2016 | Hao | H04L 12/46 |
| 2017/0034053 | A1* | 2/2017 | Chanda | H04L 45/586 |
| 2017/0041209 | A1* | 2/2017 | Joshi | H04L 45/64 |
| 2017/0093618 | A1* | 3/2017 | Chanda | H04L 41/0803 |
| 2017/0317850 | A1* | 11/2017 | Huang | H04L 12/462 |
| 2017/0353572 | A1* | 12/2017 | Wang | H04L 29/06 |
| 2018/0309718 | A1* | 10/2018 | Zuo | H04L 12/4633 |

FOREIGN PATENT DOCUMENTS

| JP | 2012129648 | 7/2012 |
| JP | 2015171128 | 9/2015 |
| WO | WO 2011155510 | 12/2011 |
| WO | WO 2014136864 | 9/2014 |
| WO | WO 2015/166506 | 11/2015 |
| WO | WO 2016035306 | 3/2016 |

OTHER PUBLICATIONS

International Search Report and Written Opinion issued in International Patent Application No. PCT/CN2017/075605, dated May 22, 2017.

Office Action issued in corresponding Japanese Patent Application No. 2018555475, dated Aug. 28, 2019 (English Machine Translation).

* cited by examiner

PACKET FORWARDING

CROSS REFERENCE TO RELATED APPLICATIONS

This application is a national phase under 35 U.S.C. § 371 of International Application No. PCT/CN2017/075605, filed Mar. 3, 2017, which claims priority to Chinese Patent Application No. 201610270640.3, entitled "a packet forwarding method and a device thereof" filed on Apr. 27, 2016, each of which are incorporated herein by reference in their entirety.

BACKGROUND

In order to audit a data stream for accessing a database, a database audit device and a database server may be connected with a same switch, and a database access packet to be audited may be mirrored to the database audit device for auditing by means of the mirror function of the switch.

In a virtual environment, the database server may be a virtual machine (VM). In this case, the database audit device and a physical server in which the VM is configured as a database server may be connected with a same switch, and a database access packet to be audited received by the switch may be mirrored to the database audit device for auditing by means of the mirror function of the switch.

DETAILED DESCRIPTION OF THE EXAMPLES

The examples of the present disclosure provide a packet forwarding method and a packet forwarding device capable of applying the method. According to the packet forwarding method, a database access packet to be transmitted to a database server which connects with a switch may be mirrored to a database audit device which connects with another switch for auditing.

Figure 1:
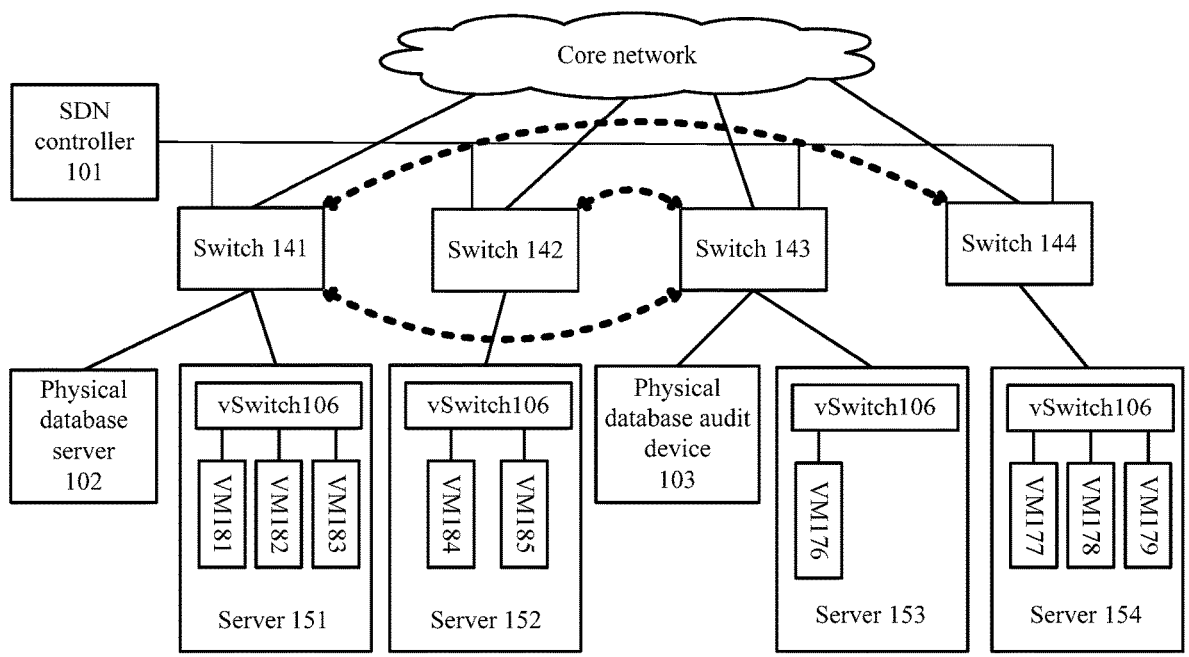
FIG. 1 is a networking schematic diagram of a virtual network according to one example of the present disclosure.

The examples of the present disclosure may be applied to a virtual network as shown in FIG. 1. FIG. 1 is a networking schematic diagram of a virtual network according to one example of the present disclosure. The virtual network comprises an software defined network (SDN) controller 101, a database server and a database audit device. The database server may be implemented by a physical device, such as a physical database server 102 in FIG. 1, or a virtual machine (VM), such as VMs 181-185 in FIG. 1 which run database server software and are capable to function as a database server. The database audit device may be implemented by a physical device, such as the physical database audit device 103 in FIG. 1, or a VM, such as VMs 176-179 in FIG. 1 which run database audit device software and are capable to function as a database audit device. For ease of description, a database server implemented by a physical device may be referred to as a physical database server; a database server implemented by a VM may be referred to as a database server VM; a database audit device implemented by a physical device may be referred to as a physical database audit device; and a database audit device implemented by a VM may be referred to as a database audit device VM hereinafter.

A virtual extensible LAN (VXLAN) tunnel may be established between access devices (e.g. switches 141-144) connected with a database server or a database audit device, so as to realize full tunnel connection between any two access devices.

The access device connected with a database server may be a physical switch connected with a physical database server, or a virtual switch (vSwitch) connected with a database server VM, or an external physical switch connected with a physical server in which the database server VM is configured. The access device connected with a database audit device may be a physical switch connected with a physical database audit device, or a vSwitch connected with a database audit device VM, or an external physical switch connected with a physical server in which the database audit device VM is configured.

Specifically, when the physical database server and the physical server in which the database server VM is configured are connected with a same physical switch, the physical switch may establish a VXLAN tunnel with another access device. For example, a VXLAN tunnel may be established between the physical switch and another access device, but not between the vSwitch connected with the database server VM and another access device. For example, in FIG. 1, the switch 141 may be connected with the database server 102 and the physical server 151 in which the database server VMs 181-183 are configured. In this case, a VXLAN tunnel may be established between the switch 141 and another access device, but not between the vSwitch 106 connected with the database server VMs 181-183 and another access device. When the physical database audit device 103 and the physical server 153 in which the database audit device VM 176 is configured are connected with the same physical switch 143, a VXLAN tunnel may be established similarly.

In an example, a VXLAN tunnel may be established manually or automatically. Wherein, the manual manner may refer to manually configuring an interface of a tunnel on an access device, and a source internet protocol (IP) address of the tunnel is designated as an IP address of the local access device as well as a destination IP address of the tunnel is designated as an IP address of a remote access device. The automatic manner may refer to establishing a VXLAN tunnel between a local access device and a remote access device automatically when the remote access device is discovered by the local access device via an enhanced neighbor discovery protocol (ENDP).

When a database access packet of a database server is to be audited, a mirror image rule may be configured on an SDN controller by means of a static configuration or any other means, and then stored in a global mirror image rule configuration table. The mirror image rule may comprise: an IP address of the database server, a media access control (MAC) address of a database audit device, and a VXLAN tunnel between an access device connected with the database server and an access device connected with the database audit device. The SDN controller may carry the mirror image rule in a mirror image rule adding message, and transmit the mirror image rule adding message to the access device connected with the database server. The format of the global mirror image rule configuration table on the SDN controller may be as shown in Table 1.

In an example, the mirror image rule may also be transmitted to the SDN controller for configuration via an upper management platform connected with the SDN controller, which is not limited by the examples of the present disclosure.

After receiving the mirror image rule adding message, an access device connected with the database server may add the mirror image rule carried in the mirror image rule adding message into a mirror image rule table as shown in Table 2.

TABLE 1

| ID of access device | Mirror image rule | | |
|---|---|---|---|
| | IP address | MAC address | VXLAN tunnel |
| SW1 | The IP address of the database server | The MAC address of the database audit device | The VXLAN tunnel between SW1 and SW2 |

As can be seen from Table 1, the global mirror image rule configuration table on the SDN controller records a mirror image rule and an identification (ID) of an access device to configure the mirror image rule, wherein the ID of the access device may be an IP address, a name or the like of the access device.

TABLE 2

| IP address | MAC address | VXLAN tunnel |
|---|---|---|
| The IP address of the database server | The MAC address of the database audit device | The VXLAN tunnel between SW1 and SW2 |

In an example, in Table 1 and Table 2, ID "SW1" represents the access device connected with the database server, and ID "SW2" represents the access device connected with the database audit device.

The VXLAN tunnel in the mirror image rule may be represented by a source IP address and a destination IP address of the VXLAN tunnel, wherein the source IP address may be the IP address of the access device SW1, and the destination IP address may be the IP address of the access device SW2.

Figure 2:
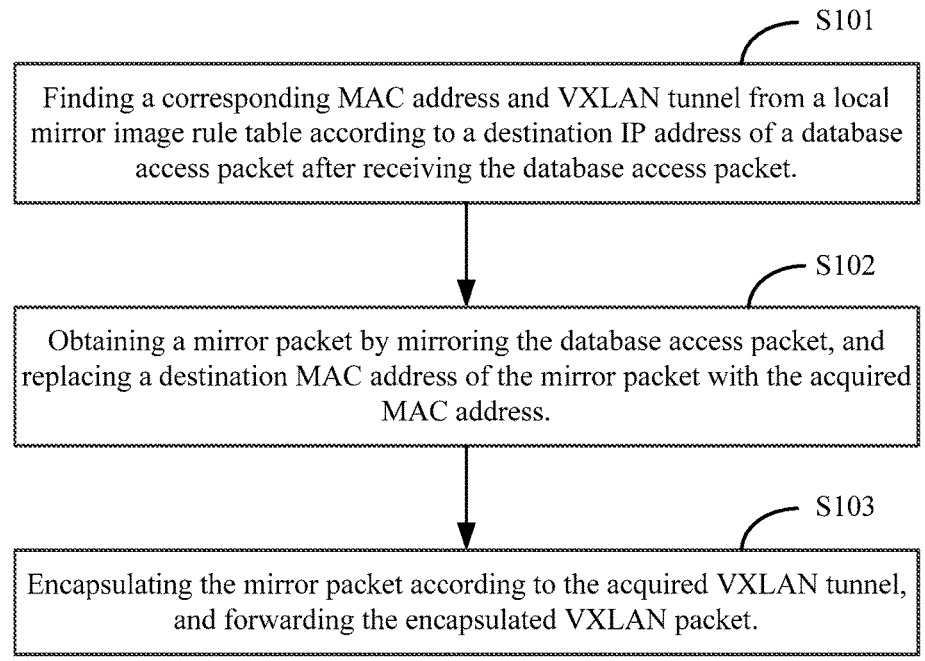
FIG. 2 is a flowchart showing how an access device connected with a database server processes a database access packet according to one example of the present disclosure.

After the mirror image rule has been configured, the access device connected with the database server may mirror a database access packet to be transmitted to the database server to the database audit device for auditing according to the mirror image rule. FIG. 2 is a flowchart showing how an access device connected with a database server processes a database access packet according to one example of the present disclosure. Specifically, as shown in FIG. 2, the operations to be executed by the access device may comprise the following blocks.

At block S101, after receiving a database access packet, the access device may find a MAC address and VXLAN tunnel from a local mirror image rule table according to a destination IP address of the database access packet.

As shown in Table 2, the found MAC address is the MAC address of the database audit device, and the found VXLAN tunnel is the VXLAN tunnel between the access device SW1 and another access device SW2 connected with the database audit device.

At block S102, the access device may obtain a mirror packet by mirroring the received database access packet, and replace the destination MAC address of the mirror packet with the found MAC address.

In an example, a mirror packet obtained by mirroring the received database access packet is the same as the received database access packet. The layer 2 forwarding may be performed on the received database access packet according to the destination MAC address of the packet. For example, the access device may find a corresponding outgoing interface from a locally stored MAC address table according to the destination MAC address of the packet, and forward the received packet to the database server via the found outgoing interface.

At block S103, the access device may encapsulate the mirror packet according to the found VXLAN tunnel and forward the encapsulated VXLAN packet.

Specifically, a VXLAN header of eight bytes, a user datagram protocol (UDP) header of eight bytes and an IP header of twenty bytes may be added to the mirror packet. At block S103, the encapsulated VXLAN packet may be forwarded to an access device connected with the database audit device.

After receiving the VXLAN packet, the access device connected with the database audit device may decapsulate the received VXLAN packet to obtain the mirror packet. The access device may perform layer 2 forwarding according to the destination MAC address of the mirror packet. For example, the access device may find a corresponding outgoing interface from a MAC address table according to the destination MAC address of the mirror packet, and forward the mirror packet to the database audit device via the outgoing interface.

In the method provided by the examples of the present disclosure, the mirror image rule table on the access device connected with the database server may store: an IP address of the database server, a MAC address of the database audit device, and a VXLAN tunnel between the access device and another access device connected with the database audit device. Therefore, after receiving a database access packet, the access device connected with the database server may find the MAC address and VXLAN tunnel corresponding to the destination IP address of the database access packet from the mirror image rule table; and after mirroring the database access packet, the destination MAC address of the mirror packet may be replaced by the found MAC address; subsequently, after encapsulating the mirror packet according to the found VXLAN tunnel, the encapsulated VXLAN packet may be forwarded to the access device connected with the database audit device. After receiving the VXLAN packet, the access device connected with the database audit device may decapsulate the VXLAN packet to obtain the mirror packet and forward the mirror packet to the database audit device according to the destination MAC address of the mirror packet. Therefore, the method may mirror a database access packet to be transmitted to a database server connected with an access device to a database audit device connected with another access device for auditing.

Subsequently, when an access data stream to the database server is not to be audited, the corresponding mirror image rule may be deleted from the global mirror image rule configuration table by means of static configuration or other means. In this case, the SDN controller may transmit a mirror image rule deleting message to the access device connected with the database server. Wherein, the mirror image rule deleting message may carry at least one piece of information comprised in the mirror image rule. The at least one piece of information may be any one of the IP address, the MAC address and the VXLAN tunnel comprised in the mirror image rule, or any combination thereof. After receiving the mirror image rule deleting message, the access device connected with the database server may search the mirror image rule table for a mirror image rule comprising the at least one piece of information, and then delete the found mirror image rule.

In a virtual network, the database server may be a VM, and the database audit device may also be a VM. The virtual network may support VM migration, and so a database access packet may shall be audited in a dynamic migration process of the VM.

A forwarding process of a database access packet during a migration of a database server VM may be described briefly as follows.

In a first case, when a database server VM is to be migrated, a VM management software may transmit a migration start notification to the SDN controller. Wherein, the migration start notification may carry address information of the database server VM, an ID of the access device (referred to as a third access device in the first case) connected with the database server VM before the migration, an ID of the access device (referred to as a first access device in the first case) connected with the database server VM after the migration, and the like. After receiving the migration start notification, the SDN controller may search the global mirror image rule configuration table for a mirror image rule comprising the IP address of the database server VM. Wherein, a database audit device identified by the MAC address comprised in the mirror image rule (the database audit device may be referred to as a first database audit device in the first case) may be connected with an access device (referred to as a second access device in the first case). Then, a duplicate of the found mirror image rule may be added in the global mirror image rule configuration table, and the VXLAN tunnel comprised in the duplicate may be replaced with the VXLAN tunnel between the first access device and the second access device so as to generate a new mirror image rule. Finally, the new mirror image rule may be carried in a mirror image rule adding message, and the mirror image rule adding message may be transmitted to the first access device by the SDN controller.

In an example, the VXLAN tunnel comprised in the duplicate of the found mirror image rule may be replaced with the VXLAN tunnel between the first access device and the second access device. For example, the source IP address of the VXLAN tunnel comprised in the duplicate of the found mirror image rule may be replaced with the IP address of the first access device.

After receiving the mirror image rule adding message, the first access device may add the new mirror image rule in a local mirror image rule table. In this case, the third access device connected with the database server VM before the migration and the first access device connected with the database server VM after the migration may be both configured with a mirror image rule corresponding to the database server VM. Therefore, after receiving a database access packet to be transmitted to the database server VM, both of the third access device and the first access device may transmit a mirror packet of the database access packet to the second access device according to the method shown in FIG. 2, and then the second access device may forward the mirror packets to the first database audit device for auditing.

When the database server VM has been migrated successfully, the VM management software may transmit a migration completion notification to the SDN controller. Wherein the migration completion notification may carry address information of the database server VM, the ID of the third access device connected with the database server VM before the migration, the ID of the first access device connected with the database server VM after the migration and the like. After receiving the migration completion notification, the SDN controller may delete the mirror image rule comprising the IP address of the database server VM and the VXLAN tunnel between the third access device and the second access device from the global mirror image rule configuration table, and then transmit a mirror image rule deleting message carrying the IP address of the database server VM to the third access device.

In a example, the deletion of a mirror image rule may not only be triggered by the migration completion of the database server VM, but also be triggered by other circumstances. For example, if there are two database audit devices in a network, the addition and deletion of a mirror image rule may also be triggered when switching the database audit devices.

In a example, the mirror image rule comprising the IP address of the database server VM and the VXLAN tunnel between the third access device and the second access device may be deleted. For example, the mirror image rule comprising the IP address of the database server VM and the VXLAN tunnel whose source IP address is the IP address of the third access device may be deleted.

After receiving the mirror image rule deleting message, according to the IP address of the database server VM carried in the mirror image deleting message, the third access device may search the mirror image rule table for a mirror image rule comprising the IP address and then delete the found mirror image rule. In this way, the first access device connected with the VM after the migration is configured with the mirror image rule corresponding to the database server VM. Therefore, when receiving a database access packet to be transmitted to the database server VM, the first access device may transmit a mirror packet of the database access packet to the second access device with the method shown in FIG. 2, and then the second access device may forward the mirror packet to the first database audit device for auditing.

In a second case, when a database server VM is to be migrated, the VM management software may transmit a migration start notification to the SDN controller. Wherein, the migration start notification may carry address information of the database server VM, an ID of the access device (referred to as a first access device in the second case) connected with the database server VM before the migration, an ID of the access device (referred to as a third access device in the second case) connected with the database server VM after the migration and the like. After receiving the migration start notification, the SDN controller may search the global mirror image rule configuration table for a mirror image rule comprising the IP address of the database server VM. Wherein, a database audit device identified by the MAC address comprised in the mirror image rule (the database audit device may be referred to as a first database audit device in the second case) may be connected with an access device (referred to as a second access device in the second case). Then, a duplicate of the found mirror image rule may be added in the global mirror image rule configuration table, and the VXLAN tunnel comprised in the duplicate may be replaced with the VXLAN tunnel between the third access device and the second access device so as to generate a new mirror image rule. Finally, the new mirror image rule may be carried in a mirror image rule adding message, and the mirror image rule adding message may be transmitted to the third access device by the SDN controller.

In an example, the VXLAN tunnel comprised in the duplicate of the found mirror image rule may be replaced with the VXLAN tunnel between the third access device and the second access device. For example, the source IP address of the VXLAN tunnel comprised in the duplicate of the found mirror image rule may be replaced with the IP address of the third access device.

After receiving the mirror image rule adding message, the third access device may add the new mirror image rule in the local mirror image rule table. In this case, the first access device connected with the database server VM before the migration and the third access device connected with the database server VM after the migration may be both configured with a mirror image rule corresponding to the database server VM. Therefore, after receiving a database access packet to be transmitted to the database server VM, both of the first access device and the third access device may transmit a mirror packet of the database access packet to the second access device with the method shown in FIG. 2, and then the second access device may forward the mirror packets to the first database audit device for auditing.

After the database server VM has been migrated successfully, the VM management software may transmit a migration completion notification to the SDN controller. Wherein, the migration completion notification may carry address information of the database server VM, the ID of the first access device connected with the database server VM before the migration, the ID of the third access device connected with the database server VM after the migration and the like. After receiving the migration completion notification, the SDN controller may delete the mirror image rule comprising the IP address of the database server VM and the VXLAN tunnel between the first access device and the second access device from the global mirror image rule configuration table, and then transmit a mirror image rule deleting message carrying the IP address of the database server VM to the first access device.

In an example, the mirror image rule comprising the IP address of the database server VM and the VXLAN tunnel between the first access device and the second access device may be deleted. For example, a mirror image rule comprising the IP address of the VM and the VXLAN tunnel whose source IP address is the IP address of the first access device may be deleted.

After receiving the mirror image rule deleting message, according to the IP address of the database server VM carried in the mirror image rule deleting message, the first access device may search the mirror image rule table for a mirror image rule comprising the IP address and then delete the found mirror image rule. In this way, the third access device connected with the database server VM after the migration is configured with a mirror image rule corresponding to the database server VM. Therefore, after receiving a database access packet to be transmitted to the database server VM, the third access device may transmit a mirror packet of the database access packet to the second access device with the method shown in FIG. 2, and then the second access device may forward the mirror packet to the first database audit device for auditing.

Of course, since the database server VM has been migrated from the first access device, a packet to be transmitted to the database server VM will not be forwarded to the first access device. Therefore, the mirror image rule corresponding to the database server VM on the first access device may not be deleted initiatively, but remain for automatic aging.

A forwarding process of a database access packet in a migration of a database audit device VM may be described briefly as follows:

In a third case, when a database audit device VM is to be migrated, the VM management software may transmit a migration start notification to the SDN controller. Wherein, the migration start notification may carry address information of the database audit device VM, an ID of the access device (referred to as a third access device in the third case) connected with the database audit device VM before the migration, and an ID of the access device (referred to as a second access device in the third case) connected with the database audit device VM after the migration. After receiving the migration start notification, the SDN controller may search the global mirror image rule configuration table for a mirror image rule comprising a MAC address of the database audit device VM. Wherein, a database server identified by the IP address comprised in the mirror image rule (the database server may be referred to as a first database server in the third case) may be connected with an access device (referred to as a first access device in the third case). Then, a duplicate of the found mirror image rule may be added in the global mirror image rule configuration table; and a VXLAN tunnel comprised in the duplicate may be replaced with a VXLAN tunnel between the first access device and the second access device so as to generate a new mirror image rule. Finally, the new mirror image rule may be carried in a mirror image rule adding message, and the mirror image rule adding message may be transmitted to the first access device by the SDN controller.

In an example, the VXLAN tunnel comprised in the duplicate of the found mirror image rule may be replaced with the VXLAN tunnel between the first access device and the second access device. For example, a destination IP address of the VXLAN tunnel comprised in the duplicate of the found mirror image rule may be replaced with an IP address of the second access device.

After receiving the mirror image rule adding message, the first access device may add the new mirror image rule into the local mirror image rule table. In this case, the first access device is not only configured with a mirror image rule comprising an IP address of the first database server, a MAC address of the database audit device VM and a VXLAN tunnel between the first access device and the third access device, but also configured with a mirror image rule comprising the IP address of the first database server, the MAC address of the database audit device VM and the VXLAN tunnel between the first access device and the second access device. Therefore, after receiving a database access packet to be transmitted to the first database server, the first access device may transmit a mirror packet of the database access packet to the third access device and the second access device with the method shown in FIG. 2, and then the third access device and the second access device may both forward the mirror packet to the database audit device VM for auditing.

After the database audit device VM has been migrated successfully, the VM management software may transmit a migration completion notification to the SDN controller. Wherein, the migration completion notification may carry the address information of the database audit device VM, the ID of the third access device connected with the database audit device VM before the migration, and the ID of the second access device connected with the database audit device VM after the migration. After receiving the migration completion notification, the SDN controller may delete the mirror image rule comprising the MAC address of the database audit device VM and the VXLAN tunnel between the first access device and the third access device from the global mirror image rule configuration table, and then transmit a mirror image rule deleting message carrying the MAC address of the database audit device VM and the VXLAN tunnel between the first access device and the third access device to the first access device.

In an example, the mirror image rule comprising the MAC address of the database audit device VM and the VXLAN tunnel between the first access device and the third access device may be deleted. For example, a mirror image rule comprising the MAC address of the database audit device VM and a VXLAN tunnel whose destination IP address is the IP address of the third access device may be deleted.

After receiving the mirror image rule deleting message, according to the MAC address of the database audit device VM and the VXLAN tunnel between the first access device and the third access device carried in the mirror image rule deleting message, the first access device may search the mirror image rule table for a corresponding mirror image rule and then delete the found mirror image rule. In this case, the mirror image rule table of the first access device may be configured with the mirror image rule comprising the IP address of the first database server, the MAC address of the database audit device VM, and the VXLAN tunnel between the first access device and the second access device. Therefore, after receiving a database access packet to be transmitted to the first database server, the first access device may transmit a mirror packet of the database access packet to the second access device with the method shown in FIG. 2, and then the second access device may forward the mirror packet to the database audit device VM for auditing.

The audit of the database access packet during a dynamic migration process of the database server VM or the database audit device VM, is realized by the above method.

Wherein, during the migration process of the database server VM, when the migration starts, a mirror image rule corresponding to the database server VM may be replaced with a new mirror image rule and the new mirror image rule may be configured on an access device connected with the database server VM after the migration; and after the completion of the migration, the mirror image rule corresponding to the database server VM may be deleted from the access device connected with the database server VM before the migration. Therefore, a dynamic following of the mirror image rule corresponding to a database server VM may be realized during a dynamic migration process of the database server VM, and the audit of a database access packet to be transmitted to the database server VM may not be influenced during the migration process without changing the position of the database audit device to which the database access packet is to be mirrored.

During the migration process of the database audit device VM, when the migration starts, an access device connected with a corresponding database server may be configured with a new mirror image rule. The new mirror image rule may comprise an IP address of the database server, a MAC address of the database audit device VM, and a VXLAN tunnel between an access device connected with the database server and an access device connected with the database audit device VM after the migration; and after the completion of the migration, a mirror image rule comprising an IP address of the database server, a MAC address of the database audit device VM, and a VXLAN tunnel between the access device connected with the database server and the access device connected with the VM before the migration may be deleted, thus ensuring the audit of a database access packet to be mirrored to the database audit device VM may not be influenced during the migration process of the database audit device VM.

The above illustrated method will be described in detail hereinafter taking a practical network shown in FIG. 1 as an example. In FIG. 1, a VXLAN tunnel may be established between any two of switches 141, 142, 143 and 144. The VMs 181-185 are database server VMs, and the VMs 176-179 are database audit device VMs.

The IP address and MAC address of the VMn are denoted by VMn-IP and VMn-MAC, respectively, wherein n=181, 182, . . . 185, 176, 177, . . . 179. The IP address and MAC address of the physical database server 102 are denoted by IP102 and MAC102, respectively. The IP address and MAC address of the physical database audit device 103 are denoted by IP103 and MAC103, respectively. The VXLAN tunnel between switch i and switch j is denoted by VXLANij, wherein i=141, 142, 143, 144, j=141, 142, 143, 144, i≠j. The global mirror image rule configuration table on the SDN controller 101 may be as shown in Table 3-1; the mirror image rule table on the switch 141 may be as shown in Table 4-1; and the mirror image rule table on the switch 142 may be as shown in Table 5-1.

TABLE 3-1

| | Mirror image rule | | |
|---|---|---|---|
| Access device ID | IP address | MAC address | VXLAN tunnel |
| Switch 141 | IP 102 | VM178-MAC | VXLAN141144 |
| Switch 141 | VM181-IP | VM177-MAC | VXLAN141144 |
| Switch 141 | VM182-IP | MAC 103 | VXLAN141143 |
| Switch 141 | VM183-IP | MAC 103 | VXLAN141143 |
| Switch 142 | VM184-IP | VM176-MAC | VXLAN142143 |
| Switch 142 | VM185-IP | MAC 103 | VXLAN142143 |

TABLE 4-1

| IP address | MAC address | VXLAN tunnel |
|---|---|---|
| IP 102 | VM178-MAC | VXLAN141144 |
| VM181-IP | VM177-MAC | VXLAN141144 |
| VM182-IP | MAC 103 | VXLAN141143 |
| VM183-IP | MAC 103 | VXLAN141143 |

TABLE 5-1

| IP address | MAC address | VXLAN tunnel |
|---|---|---|
| VM184-IP | VM176-MAC | VXLAN142143 |
| VM185-IP | MAC 103 | VXLAN142143 |

The switch 141 may receive a database access packet whose destination IP address is VM182-IP and destination MAC address is VM182-MAC. By searching the mirror image rule table as shown in Table 4-1 according to the IP address VM182-IP, the switch 141 may determine that the corresponding MAC address is MAC103 and the corresponding VXLAN tunnel is VXLAN141143. A mirror packet of the database access packet is generated, and the destination MAC address VM182-MAC of the mirror packet is replaced with the MAC address MAC103. Then, the mirror packet is encapsulated according to the VXLAN tunnel VXLAN141143, and the encapsulated VXLAN packet is forwarded to the switch 143.

After receiving the VXLAN packet, the switch 143 may decapsulate the VXLAN packet to obtain the mirror packet. A corresponding outgoing interface may be found from a locally stored MAC address table according to the destination MAC address MAC103 of the mirror packet. The mirror packet may be forwarded to the physical database audit device 103 via the outgoing interface, such that the physical database audit device 103 may audit the mirror packet.

When the VM management software (not shown in FIG. 1) is to start the migration of the VM 182, the VM management software may transmit a migration start notification to the SDN controller 101. Wherein the migration start notification may carry address information of the VM 182, an ID of the switch 141 connected with the VM 182 before the migration, an ID of the switch 142 connected with the VM 182 after the migration and the like. After receiving the migration start notification, the SDN controller 101 may determine that the VM 182 is a database server VM according to the address information of the VM 182 carried in the migration start notification, and search the global mirror image rule configuration table as shown in Table 3-1 for a mirror image rule according to the IP address VM182-IP of the VM 182. As a result, the item in line 4 of Table 3-1 is found. Then the SDN controller may add a duplicate of the found mirror image rule into the Table 3-1, and replace the VXLAN tunnel VXLAN141143 comprised in the duplicate with the VXLAN tunnel VXLAN142143 between the switch 142 and the switch 143. In this way, a new mirror image rule is generated, and the Table 3-1 is updated to Table 3-2. Subsequently, the SDN controller may carry the new mirror image rule in a mirror image rule adding message, and transmit the mirror image rule adding message to the switch 142.

After receiving the mirror image rule adding message, the switch 142 may add the mirror image rule carried in the mirror image rule adding message into the local mirror image rule table as shown in Table 5-1. In this case, the Table 5-1 is updated to Table 5-2. Subsequently, when a database access packet is received, the database access packet may be processed according to the mirror image rule table shown in Table 5-2.

TABLE 3-2

| | Mirror image rule | | |
|---|---|---|---|
| Access device ID | IP address | MAC address | VXLAN tunnel |
| Switch 141 | IP 102 | VM178-MAC | VXLAN141144 |
| Switch 141 | VM181-IP | VM177-MAC | VXLAN141144 |
| Switch 141 | VM182-IP | MAC 103 | VXLAN141143 |
| Switch 142 | VM182-IP | MAC 103 | VXLAN142143 |
| Switch 141 | VM183-IP | MAC 103 | VXLAN141143 |
| Switch 142 | VM184-IP | VM176-MAC | VXLAN142143 |
| Switch 142 | VM185-IP | MAC 103 | VXLAN142143 |

TABLE 5-2

| IP address | MAC address | VXLAN tunnel |
|---|---|---|
| VM184-IP | VM176-MAC | VXLAN142143 |
| VM185-IP | MAC 103 | VXLAN142143 |
| VM182-IP | MAC 103 | VXLAN142143 |

Figure 3:
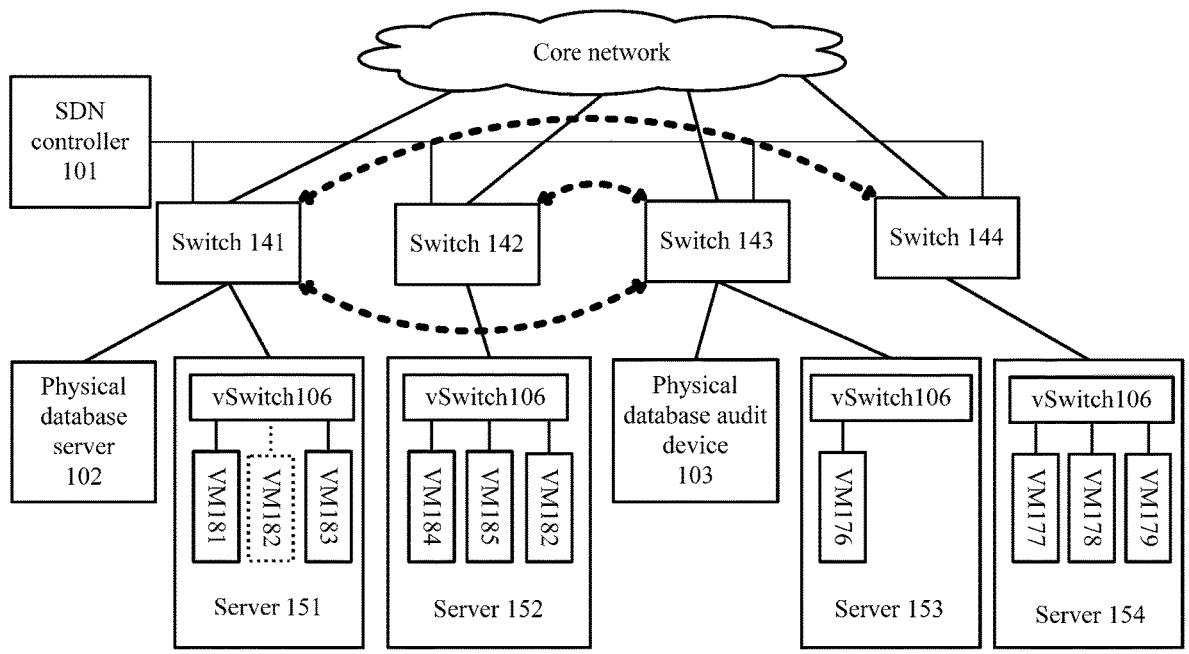
FIG. 3 is a networking schematic diagram of the virtual network shown in FIG. 1 after VM 182 is migrated according to one example of the present disclosure.

After the VM management software completes the migration of the VM 182, the virtual network as shown in FIG. 1 may be updated to the virtual network as shown in FIG. 3, and the VM management software may transmit a migration completion notification to the SDN controller 101. Wherein, the migration completion notification may carry the address information of the VM 182, the ID of the switch 141 connected with the VM 182 before the migration, the ID of the switch 142 connected with the VM 182 after the migration and the like. After receiving the migration completion notification, the SDN controller 101 may search the global mirror image rule configuration table as shown in Table 3-2 for a mirror image rule according to the IP address VM182-IP of the VM 182 and the VXLAN tunnel VXLAN141143. As a result, the item in line 4 of Table 3-2 is found, and then deleted. In this case, the Table 3-2 may be updated to Table 3-3. The SDN controller 101 may transmit a mirror image rule deleting message carrying the IP address VM182-IP to the switch 141.

After receiving the mirror image rule deleting message, the switch 141 may delete the mirror image rule comprising the IP address VM182-IP from the Table 4-1. In this case, the Table 4-1 is updated to Table 4-2. Subsequently, when a database access packet is received, the database access packet may be processed according to the mirror image rule table as shown in Table 4-2.

TABLE 3-3

| | Mirror image rule | | |
|---|---|---|---|
| Access device ID | IP address | MAC address | VXLAN tunnel |
| Switch 141 | IP 102 | VM178-MAC | VXLAN141144 |
| Switch 141 | VM181-IP | VM177-MAC | VXLAN141144 |
| Switch 142 | VM182-IP | MAC 103 | VXLAN142143 |
| Switch 141 | VM183-IP | MAC 103 | VXLAN141143 |
| Switch 142 | VM184-IP | VM176-MAC | VXLAN142143 |
| Switch 142 | VM185-IP | MAC 103 | VXLAN142143 |

TABLE 4-2

| IP address | MAC address | VXLAN tunnel |
|---|---|---|
| IP 102 | VM178-MAC | VXLAN141144 |
| VM181-IP | VM177-MAC | VXLAN141144 |
| VM183-IP | MAC 103 | VXLAN141143 |

When the VM management software is to start the migration of the VM 177, the VM management software may transmit a migration start notification to the SDN controller 101. Wherein, the migration start notification may carry address information of the VM 177, an ID of the switch 144 connected with the VM 177 before the migration, an ID of the switch 143 connected with the VM 177 after the migration and the like. After receiving the migration start notification, the SDN controller 101 may determine that the VM 177 is a database audit device VM according to the address information of the VM 177 carried in the migration start notification, and search the global mirror image rule configuration table as shown in Table 3-3 for a mirror image rule according to the MAC address VM177-MAC of the VM 177. As a result, the item in line 3 of Table 3-3 is found. The SDN controller may then add a duplicate of the found mirror image rule into the Table 3-3, and replace the VXLAN tunnel VXLAN141144 comprised in the duplicate with the VXLAN tunnel VXLAN141143 between the switch 141 and the switch 143. In this way, a new mirror image rule is generated and the Table 3-3 may be updated to Table 3-4. Subsequently, the SDN controller may carry the new mirror image rule in a mirror image rule adding message, and transmit the mirror image rule adding message to the switch 141.

After receiving the mirror image rule adding message, the switch 141 may add the mirror image rule carried in the mirror image rule adding message into the local mirror image rule table as shown in Table 4-2. In this case, the Table 4-2 may be updated to Table 4-3. Subsequently, when a database access packet is received, the database access packet may be processed according to the mirror image rule table as shown in Table 4-3.

TABLE 3-4

| Access device ID | Mirror image rule | | |
|---|---|---|---|
| | IP address | MAC address | VXLAN tunnel |
| Switch 141 | IP 102 | VM178-MAC | VXLAN141144 |
| Switch 141 | VM181-IP | VM177-MAC | VXLAN141144 |
| Switch 141 | VM181-IP | VM177-MAC | VXLAN141143 |
| Switch 142 | VM182-IP | MAC 103 | VXLAN142143 |
| Switch 141 | VM183-IP | MAC 103 | VXLAN141143 |
| Switch 142 | VM184-IP | VM176-MAC | VXLAN142143 |
| Switch 142 | VM185-IP | MAC 103 | VXLAN142143 |

TABLE 4-3

| IP address | MAC address | VXLAN tunnel |
|---|---|---|
| IP 102 | VM178-MAC | VXLAN141144 |
| VM181-IP | VM177-MAC | VXLAN141144 |
| VM181-IP | VM177-MAC | VXLAN141143 |
| VM183-IP | MAC 103 | VXLAN141143 |

Figure 4:
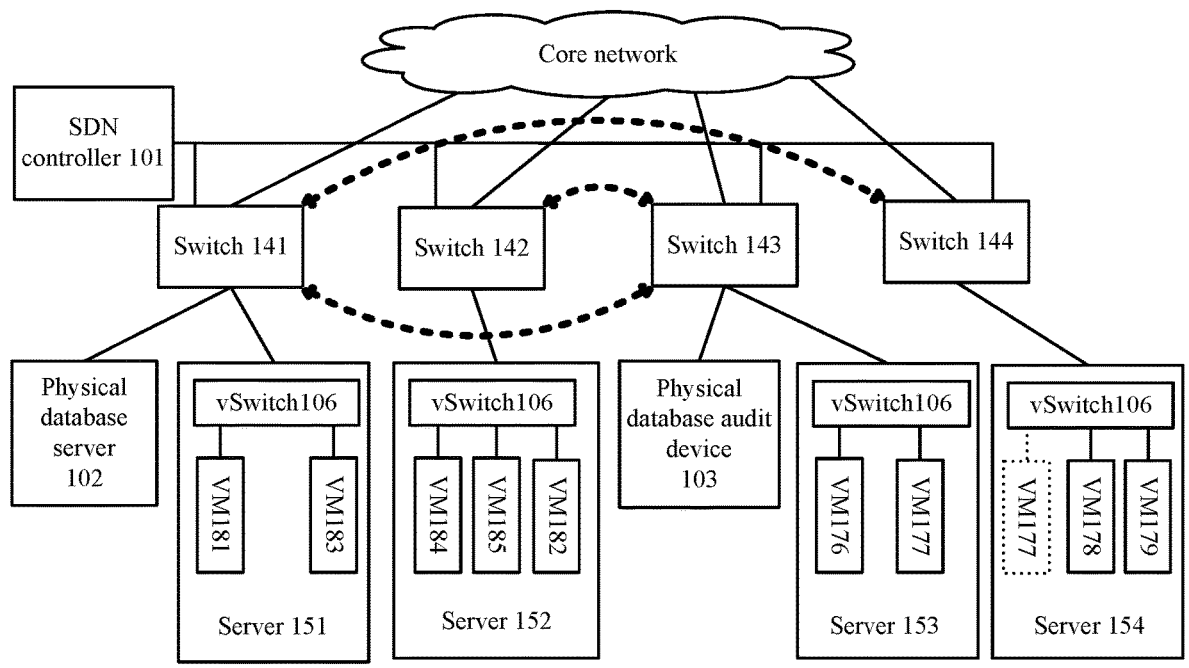
FIG. 4 is a networking schematic diagram of the virtual network shown in FIG. 3 after VM 177 is migrated according to one example of the present disclosure.

After the VM management software completes the migration of the VM 177, the virtual network as shown in FIG. 3 may be updated to the virtual network as shown in FIG. 4. Then the VM management software may transmit a migration completion notification to the SDN controller 101. Wherein, the migration completion notification may carry the address information of the VM 177, the ID of the switch 144 connected with the VM 177 before the migration, the ID of the switch 143 connected with the VM 177 after the migration and the like. After receiving the migration completion notification, the SDN controller 101 may search the global mirror image rule configuration table as shown in Table 3-4 for a mirror image rule according to the MAC address VM177-MAC of the VM 177 and the VXLAN tunnel VXLAN141144. As a result, the item in line 3 of Table 3-4 is found and then deleted. In this case, the Table 3-4 may be updated to Table 3-5. The SDN controller 101 may transmit a mirror image rule deleting message carrying the MAC address VM177-MAC and the VXLAN tunnel VXLAN141144 to the switch 141.

After receiving the mirror image rule deleting message, the switch 141 may delete a mirror image rule comprising the MAC address VM177-MAC and the VXLAN tunnel VXLAN141144 from the local mirror image rule table as shown in Table 4-3. In this case, the Table 4-3 may be updated to Table 4-4. Subsequently, when a database access packet is received, the database access packet may be processed according to the mirror image rule table as shown in Table 4-4.

TABLE 3-5

| Access device ID | Mirror image rule | | |
|---|---|---|---|
| | IP address | MAC address | VXLAN tunnel |
| Switch 141 | IP 102 | VM178-MAC | VXLAN141144 |
| Switch 141 | VM181-IP | VM177-MAC | VXLAN141143 |
| Switch 142 | VM182-IP | MAC 103 | VXLAN142143 |
| Switch 141 | VM183-IP | MAC 103 | VXLAN141143 |
| Switch 142 | VM184-IP | VM176-MAC | VXLAN142143 |
| Switch 142 | VM185-IP | MAC 103 | VXLAN142143 |

TABLE 4-4

| IP address | MAC address | VXLAN tunnel |
|---|---|---|
| IP 102 | VM178-MAC | VXLAN141144 |
| VM181-IP | VM177-MAC | VXLAN141143 |
| VM183-IP | MAC 103 | VXLAN141143 |

Corresponding to the examples of the packet forwarding method aforementioned, the present disclosure further provides a packet forwarding device 60 and another packet forwarding device 70, and the examples thereof.

Figure 5:
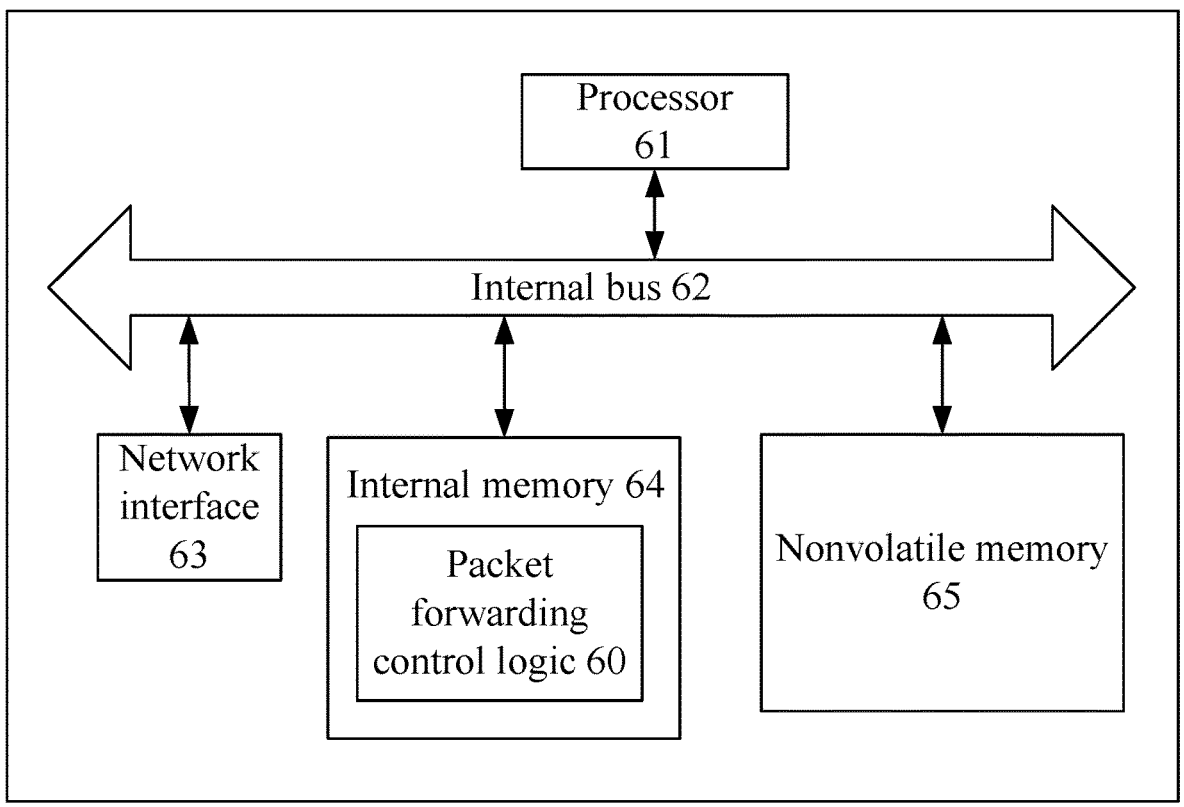
FIG. 5 is a schematic diagram of a hardware architecture of an access device according to one example of the present disclosure.

In one example, the packet forwarding device 60 of the present disclosure may be applied to an access device. An example of the packet forwarding device 60 may be implemented by means of software, hardware or the combination thereof. With respect to the hardware level, FIG. 5 is a schematic diagram of a hardware structure of an access device in which the packet forwarding device 60 is configured. As shown in FIG. 5, besides a processor 61, an internal bus 62, a network interface 63, an internal memory 64 and a nonvolatile memory 65, the access device in which the packet forwarding device 60 is configured may further comprise other hardwares according to the practical functions of the access device, and the description thereof will be omitted herein. Take the software implementation as an example, the packet forwarding device 60, as a device in a logical level, may be formed by reading, via the processor 61 of the access device in which the packet forwarding device 60 is configured, machine executable instructions corresponding to a packet forwarding control logic in the nonvolatile memory 65 to the internal memory 64 for running.

Figure 6:
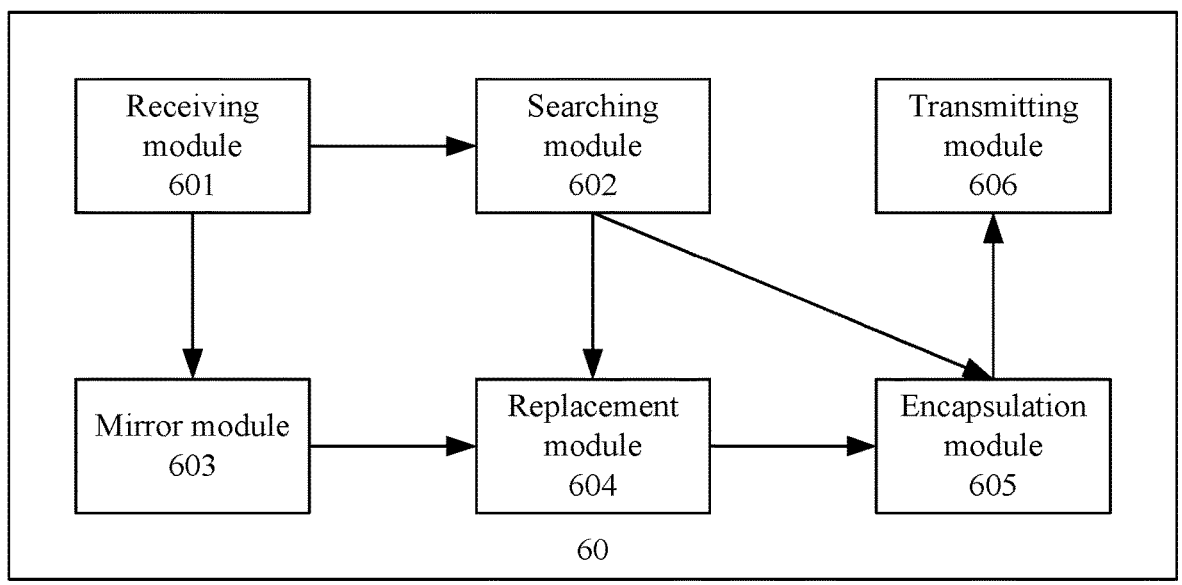
FIG. 6 is a structural schematic diagram of a packet forwarding device applied to the access device according to one example of the present disclosure.

With reference to FIG. 6, the packet forwarding device 60 applied to an access device may comprise the following modules: a receiving module 601, a searching module 602, a mirror module 603, a replacement module 604, an encapsulation module 605 and a transmitting module 606.

Where, the receiving module 601 is used for receiving a database access packet.

The searching module 602 is used to search, after the receiving module 601 receives the database access packet, a local mirror image rule table according to a destination IP address of the database access packet received by the receiving module 601 for a corresponding MAC address and VXLAN tunnel. Where the mirror image rule table may comprise at least one mirror image rule. Each mirror image rule may comprise an IP address of a database server connected with the access device, a MAC address of an database audit device, and a VXLAN tunnel between the access device and another access device connected with the database audit device.

The mirror module 603 is used for mirroring the database access packet received by the receiving module 601 so as to generate a mirror packet of the database access packet.

The replacement module 604 is used for replacing a destination MAC address of the mirror packet obtained by the mirror module 603 with the MAC address found by the searching module 602.

The encapsulation module 605 is used for encapsulating the mirror packet replaced by the replacement module 604 according to the VXLAN tunnel found by the searching module 602.

The transmitting module 606 is used for forwarding the VXLAN packet encapsulated by the encapsulation module 605.

Figure 7:
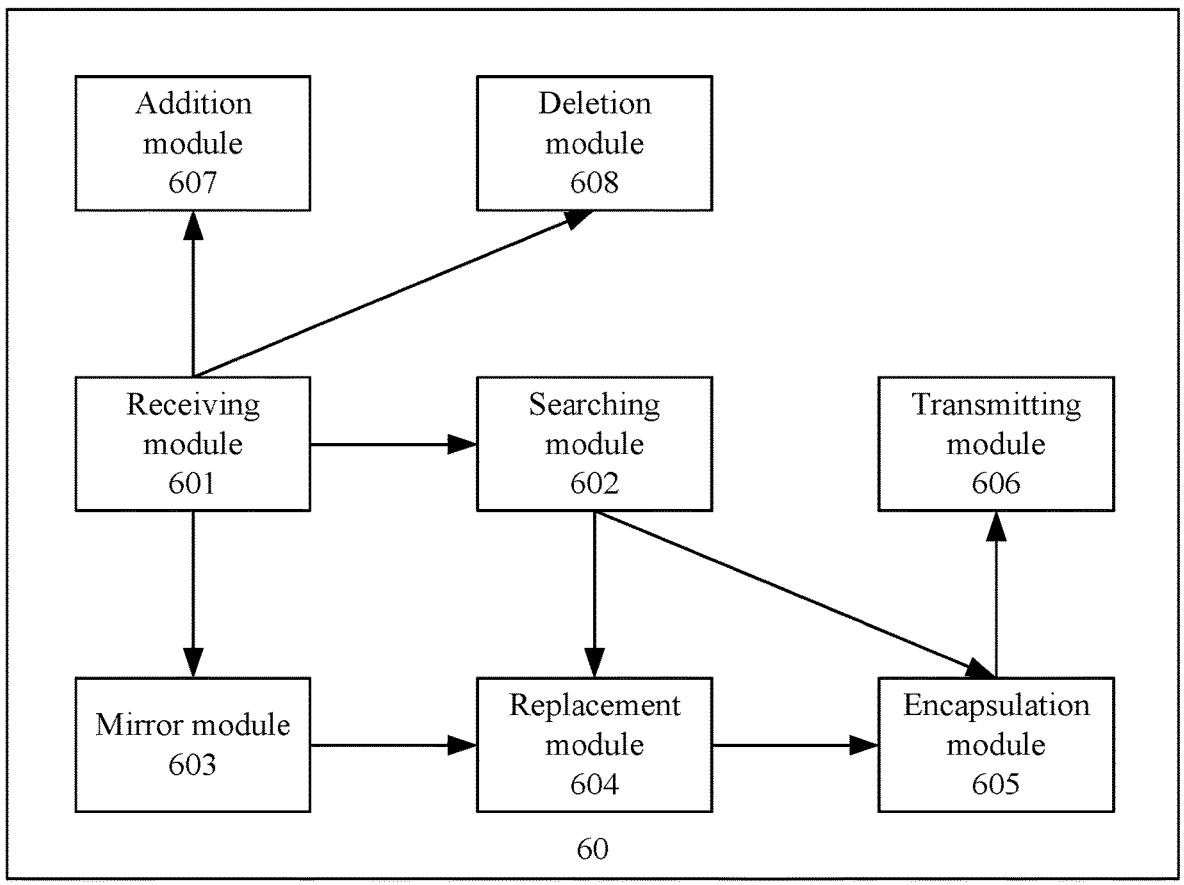
FIG. 7 is another structural schematic diagram of a packet forwarding device applied to the access device according to one example of the present disclosure.

FIG. 7 is another structural schematic diagram of a packet forwarding device applied to an access device according to one example of the present disclosure. As shown in FIG. 7, the packet forwarding device 60 applied to an access device may further comprise an addition module 607 and a deletion module 608.

Where, the receiving module 601 may further receive a mirror image rule adding message and a mirror image rule deleting message transmitted by the SDN controller. Where, the mirror image rule deleting message may carry at least one piece of information comprised in the mirror image rule to be deleted.

The addition module 607 is used for adding a mirror image rule carried in the mirror image rule adding message received by the receiving module 601 into the local mirror image rule table.

The deletion module 608 is used for searching the local mirror image rule table for a mirror image rule according to the at least one piece of information carried in the mirror image rule deleting message and deleting the found mirror image rule from the local mirror image rule table.

Figure 8:
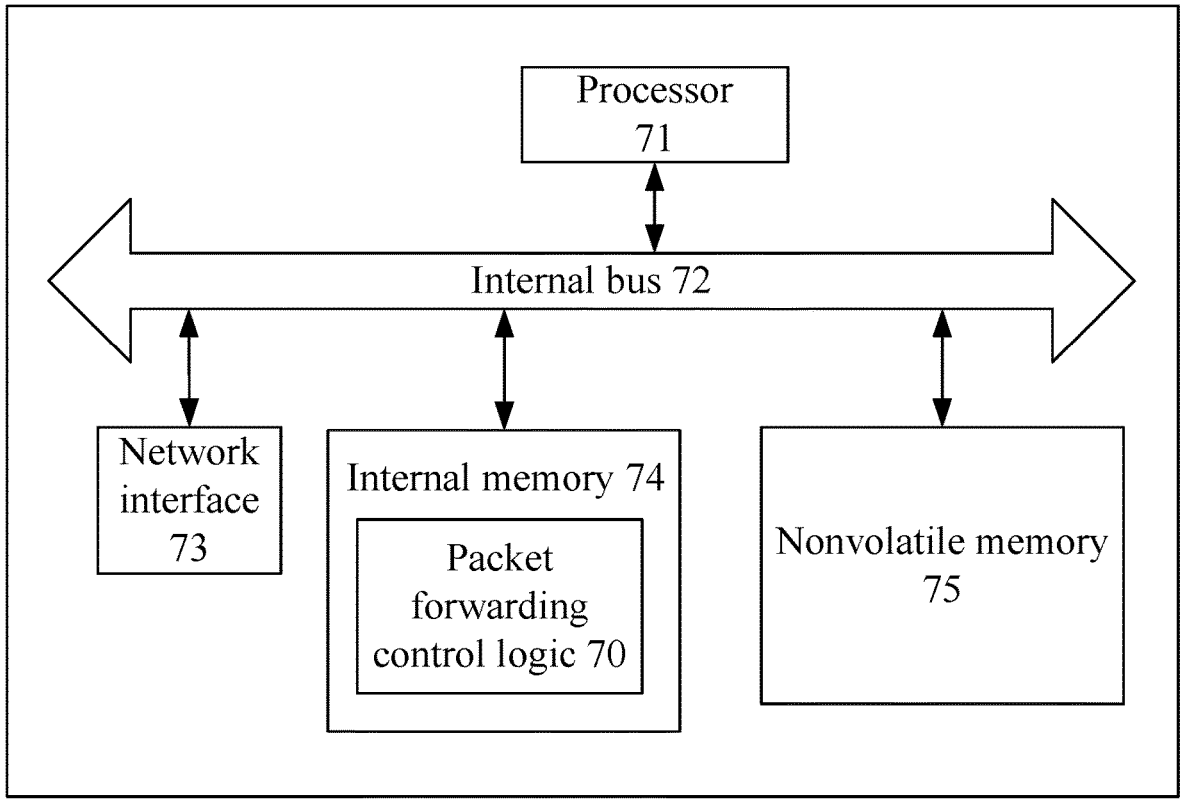
FIG. 8 is a hardware architecture schematic diagram of an SDN controller according to one example of the present disclosure.

In another example, the packet forwarding device 70 of the present disclosure may be applied to an SDN controller. The packet forwarding device 70 may be implemented by means of software, hardware or the combination thereof. With respect to the hardware level, FIG. 8 is a hardware structure diagram of the SDN controller in which the packet forwarding device 70 is configured. As shown in FIG. 8, besides a processor 71, an internal bus 72, a network interface 73, an internal memory 74 and a nonvolatile memory 75, the SDN controller in which the packet forwarding device 70 is configured may further comprise other hardwares according to the practical functions of the SDN controller, and the description thereof will be omitted herein. Take the software implementation as an example, the packet forwarding device 70, as a device in a logical level, may be formed by reading, via the processor 71 of the SDN controller in which the packet forwarding device 70 is configured, machine readable instructions corresponding to a packet forwarding control logic in the nonvolatile memory 75 to the internal memory 74 for running.

Figure 9:
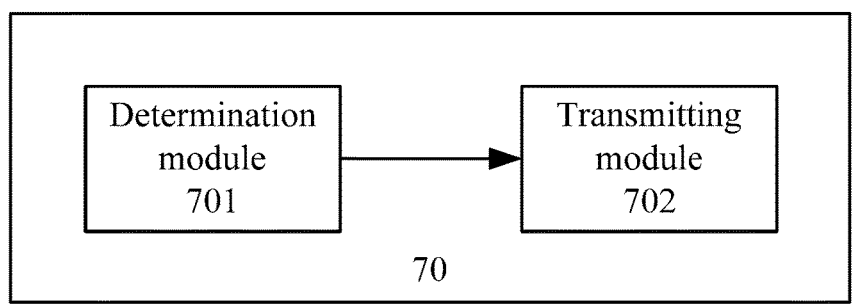
FIG. 9 is a structural schematic diagram of a packet forwarding device applied to an SDN controller according to one example of the present disclosure.

FIG. 9 is a structural schematic diagram of a packet forwarding device applied to the SDN controller according to one example of the present disclosure. With reference to FIG. 9, the packet forwarding device 70 applied to an SDN controller may comprise a determination module 701 and a transmitting module 702.

Where, the determination module 701 is used for determining whether a mirror image rule is to be configured in a first access device connected with a database server.

The transmitting module 702 is used for transmitting, when the determination module 701 determines that the mirror image rule is to be configured in the first access device, a mirror image rule adding message carrying the mirror image rule to the first access device, such that the first access device may add the mirror image rule into a local mirror image rule table and forward a packet according to the mirror image rule. Where, the mirror image rule may comprise an IP address of the database server connected with the first access device, a MAC address of a database audit device, and a VXLAN tunnel between the first access device and a second access device connected with the database audit device.

In one example, the determination module 701 may be configured to receive a migration start notification carrying address information of a VM to be migrated, an ID of a third access device connected with the VM to be migrated before the migration, and an ID of a first access device connected with the VM to be migrated after the migration. If the VM to be migrated is a database server, the determination module 701 may search a global mirror image rule configuration table for a mirror image rule comprising an IP address of the VM to be migrated. Where, a database audit device identified by a MAC address comprised in the found mirror image rule may be connected with a second access device. The determination module 701 may be further used to add a duplicate of the found mirror image rule in the global mirror image rule configuration table, replace the VXLAN tunnel comprised in the duplicate with the VXLAN tunnel between the first access device and the second access device, and thus generate a new mirror image rule. In this case, the determination module 701 may determine that the new mirror image rule may be configured in the first access device.

In another example, the determination module 701 may be configured to receive a migration start notification carrying address information of a VM to be migrated, an ID of a third access device connected with the VM to be migrated before the migration, and an ID of a second access device connected with the VM to be migrated after the migration. If the VM to be migrated is a database audit device, the determination module 701 may search a global mirror image rule configuration table for a mirror image rule comprising the MAC address of the VM to be migrated. Where, a database server identified by an IP address comprised in the found mirror image rule is connected with a first access device. The determination module 701 may be further used to add a duplicate of the found mirror image rule in the global mirror image rule configuration table, replace the VXLAN tunnel comprised in the duplicate with the VXLAN tunnel between the first access device and the second access device, and thus generate a new mirror image rule. In this case, the determination module 701 may determine that the first access device is to be configured with the new mirror image rule.

Furthermore, the determination module 701 may further determine whether a mirror image rule on a first access device is to be deleted.

When the determination module 701 determines that a mirror image rule on the first access device is to be deleted, the transmitting module 702 may transmit to the first access device a mirror image rule deleting message carrying at least one piece of information comprised in the mirror image rule to be deleted, such that the first access device may search a local mirror image rule table for a mirror image rule comprising the at least one piece of information and then delete the found mirror image rule.

In another example, the determination module 701 may be configured to receive a migration completion notification carrying address information of a VM having been migrated, an ID of a first access device connected with the VM having been migrated before the migration, and an ID of a third access device connected with the VM having been migrated after the migration. If the VM having been migrated is a database server, the determination module 701 may delete a mirror image rule comprising an IP address of the VM having been migrated and a VXLAN tunnel between the first access device and a second access device from the global mirror image rule configuration table. Where, a database audit device identified by the MAC address comprised in the mirror image rule is connected with the second access device. Furthermore, the determination module 701 may determine that the mirror image rule comprising the IP address of the VM having been migrated is to be deleted from the first access device.

In another example, the determination module 701 may be configured to receive a migration completion notification carrying address information of a VM having been migrated, an ID of a third access device connected with the VM having been migrated before the migration, and an ID of a second access device connected with the VM having been migrated after the migration. If the VM having been migrated is a database audit device, the determination module 701 may delete a mirror image rule comprising a MAC address of the VM having been migrated and a VXLAN tunnel between a first access device and the third access device from the global mirror image rule configuration table. Where, a database server identified by an IP address comprised in the deleted mirror image rule is connected with the first access device. Furthermore, the determination module 701 may determine that a mirror image rule comprising the MAC address of the VM having been migrated and the VXLAN tunnel between the first access device and the third access device is to be deleted from the first access device.

The specific implementation processes of the functions and effects of the modules in the device may refer to the implementation processes of corresponding blocks in the method, and the description thereof will be omitted herein.

With respect to the device examples, since the device examples basically correspond to the method examples, the associated descriptions may refer to the corresponding descriptions of the method examples. The device examples described above are given by way of illustration only, wherein the units described as separated components may be or not be physically separated, and the component described as a unit may be or not be a physical unit, for example the component may be configured at one place, or distributed on a plurality of network units. Parts or all of the modules in the examples may be selected according to practical requirement to achieve the objects of the solution of the present disclosure, which may be appreciated and implemented by an ordinary person skilled in the art without involving an inventive effort.

The terminologies used in the present disclosure are only intended to describe specific examples, but not to restrict the present disclosure. The singular forms "a", "an" and "the" used in the present disclosure and claims are intended to also comprise plurality forms, unless other meanings are clearly indicated in the context. As should be further appreciated, the terminology "and/or" used in the text is intended to comprise any one or all possible combinations of one or more associated listed items.

As should be appreciated, although the present disclosure may use the terminologies "first", "second", "third" and the like to describe various information, the terminologies are only used to distinguish the same type of information from each other, but not to restrict the information. For example, under the premise without deviating from the scope of the present disclosure, first information can also be called as second information; similarly, second information can also be called as first information. Depending on the context, the word "if" used in the text can be explained as "when" or "while" or "in response to determining".

The descriptions above are only preferable examples of the present disclosure, and are not used to restrict the present disclosure. Any amendments, equivalent substitutions, improvements and the like within the spirit and principle of the present disclosure are all concluded in the protection scope of the present disclosure.

The invention claimed is:

1. A method of forwarding a packet, comprising:
   determining, by a software defined network (SDN) controller, that a first access device connected with a database server is to be configured with a mirror image rule, wherein
   the mirror image rule comprises an internet protocol (IP) address of the database server connected with the first access device, a media access control (MAC) address of a database audit device connected with a second access device, and a virtual extensible LAN (VXLAN) tunnel between the first access device and the second access device; and
   transmitting, by the SDN controller, a mirror image rule adding message carrying the mirror image rule to the first access device so as to cause the first access device to, after receiving a database access packet whose destination IP address is the IP address of the database server,
      obtain a mirror packet by mirroring the database access packet,
      replace a destination MAC address of the mirror packet with the MAC address of the database audit device according to the mirror image rule,
      perform VXLAN encapsulation on the replaced mirror packet, and
      forward the encapsulated VXLAN packet.

2. The method according to claim 1, wherein determining that the first access device is to be configured with a mirror image rule, comprises:
   receiving, by the SDN controller, a migration start notification carrying address information of a virtual machine (VM) to be migrated, an ID of a third access device connected with the VM to be migrated before the migration and an ID of the first access device connected with the VM to be migrated after the migration;
   searching, by the SDN controller, a global mirror image rule configuration table for a mirror image rule comprising an IP address of the VM to be migrated in a case that the VM to be migrated is a database server, wherein a database audit device identified by a MAC address comprised in the found mirror image rule is connected with the second access device;
   generating, by the SDN controller, a new mirror image rule by adding a duplicate of the found mirror image rule into the global mirror image rule configuration table and replacing a VXLAN tunnel comprised in the duplicate with the VXLAN tunnel between the first access device the second access device; and
   determining, by the SDN controller, that the first access device is to be configured with the new mirror image rule.

3. The method according to claim 1, wherein determining that the first access device is to be configured with a mirror image rule, comprises:
- receiving, by the SDN controller, a migration start notification carrying address information of a VM to be migrated, an ID of a third access device connected with the VM to be migrated before the migration and an ID of a second access device connected with the VM to be migrated after the migration;
- searching, by the SDN controller, a global mirror image rule configuration table for a mirror image rule comprising a MAC address of the VM to be migrated in a case that the VM to be migrated is a database audit device, wherein a database server identified by an IP address comprised in the found mirror image rule is connected with the first access device;
- generating, by the SDN controller, a new mirror image rule by adding a duplicate of the found mirror image rule into the global mirror image rule configuration table and replacing a VXLAN tunnel comprised in the duplicate with the VXLAN tunnel between the first access device and the second access device; and
- determining, by the SDN controller, that the first access device is to be configured with the new mirror image rule.

4. The method according to claim 1, further comprises:
- determining, by the SDN controller, that a mirror image rule on the first access device is to be deleted; and
- transmitting, by the SDN controller, a mirror image rule deleting message carrying at least one piece of information comprised in the mirror image rule to be deleted to the first access device to cause the first access device to search a local mirror image rule table for a mirror image rule comprising the at least one piece of information, and delete the found mirror image rule.

5. The method according to claim 4, wherein determining that a mirror image rule on the first access device is to be deleted, comprises:
- receiving, by the SDN controller, a migration completion notification carrying address information of a VM having been migrated, an ID of the first access device connected with the VM having been migrated before the migration, and an ID of a third access device connected with the VM having been migrated after the migration;
- deleting, by the SDN controller, a mirror image rule comprising an IP address of the VM having been migrated and the VXLAN tunnel between the first access device and the second access device from a global mirror image rule configuration table in a case that the VM having been migrated is a database server, wherein a database audit device identified by a MAC address comprised in the mirror image rule is connected with the second access device; and
- determining, by the SDN controller, that a mirror image rule comprising the IP address of the VM having been migrated is to be deleted from the first access device.

6. The method according to claim 4, wherein determining that a mirror image rule on the first access device is to be deleted, comprises:
- receiving, by the SDN controller, a migration completion notification carrying address information of a VM having been migrated, an ID of a third access device connected with the VM having been migrated before the migration, and an ID of the second access device connected with the VM having been migrated after the migration;
- deleting, by the SDN controller, a mirror image rule comprising a MAC address of the VM having been migrated and a VXLAN tunnel between the first access device and the third access device from a global mirror image rule configuration table in a case that the VM having been migrated is a database audit device, wherein a database server identified by an IP address comprised in the mirror image rule is connected with the first access device; and
- determining, by the SDN controller, that a mirror image rule comprising the MAC address of the VM having been migrated and the VXLAN tunnel between the first access device and the third access device is to be deleted from the first access device.

7. A device of forwarding a packet, comprising
a processor, and
a storage medium storing machine executable instructions corresponding to a packet forwarding control logic,
wherein, by executing the machine executable instructions, the processor is caused to:
- determine that a first access device connected with a database server is to be configured with a mirror image rule, wherein the mirror image rule comprises an internet protocol (IP) address of the database server connected with the first access device, a media access control (MAC) address of a database audit device connected with a second access device, and a virtual extensible LAN (VXLAN) tunnel between the first access device and the second access device; and
- transmit a mirror image rule adding message carrying the mirror image rule to the first access device so as to cause the first access device to, after receiving a database access packet whose destination IP address is the IP address of the database server,
  - obtain a mirror packet by mirroring the database access packet,
  - replace a destination MAC address of the mirror packet with the MAC address of the database audit device according to the mirror image rule,
  - perform VXLAN encapsulation on the replaced mirror packet, and
  - forward the encapsulated VXLAN packet.

8. The device according to claim 7, wherein when determining that the first access device is to be configured with a mirror image rule, the machine executable instructions further cause the processor to:
- receive a migration start notification carrying address information of a virtual machine (VM) to be migrated, an ID of a third access device connected with the VM to be migrated before the migration, and an ID of the first access device connected with the VM to be migrated after the migration;
- search a global mirror image rule configuration table for a mirror image rule comprising an IP address of the VM to be migrated in a case that the VM to be migrated is a database server, wherein a database audit device identified by a MAC address comprised in the found mirror image rule is connected with the second access device;
- generate a new mirror image rule by adding a duplicate of the found mirror image rule in the global mirror image rule configuration table and replacing a VXLAN tunnel comprised in the duplicate with the VXLAN tunnel between the first access device and the second access device; and determining that the first access device is to be configured with the new mirror image rule.

9. The device according to claim 7, wherein when determining that the first access device is to be configured with a mirror image rule, the machine executable instructions further cause the processor to:
   receive a migration start notification carrying address information of a VM to be migrated, an ID of a third access device connected with the VM to be migrated before the migration and an ID of the second access device connected with the VM to be migrated after the migration;
   search a global mirror image rule configuration table for a mirror image rule comprising a MAC address of the VM to be migrated in a case that the VM to be migrated is a database audit device, wherein a database server identified by an IP address comprised in the found mirror image rule is connected with the first access device;
   generate a new mirror image rule by adding a duplicate of the found mirror image rule into the global mirror image rule configuration table and replacing a VXLAN tunnel comprised in the duplicate with the VXLAN tunnel between the first access device and the second access device; and
   determine that the first access device is to be configured with the new mirror image rule.

10. The device according to claim 7, wherein the machine executable instructions further cause the processor to:
    determine that a mirror image rule on the first access device is to be deleted; and
    transmit a mirror image rule deleting message carrying at least one piece of information comprised in the mirror image rule to be deleted to the first access device to cause the first access device to search a local mirror image rule table for a mirror image rule comprising the at least one piece of information, and delete the found mirror image rule.

11. The device according to claim 10, wherein when determining that a mirror image rule on the first access device is to be deleted, the machine executable instructions further cause the processor to:
    receive a migration completion notification carrying address information of a VM having been migrated, an ID of the first access device connected with the VM having been migrated before the migration, and an ID of a third access device connected with the VM having been migrated after the migration;
    delete a mirror image rule comprising an IP address of the VM having been migrated and the VXLAN tunnel between the first access device and the second access device from a global mirror image rule configuration table in a case that the VM having been migrated is a database server, wherein a database audit device identified by a MAC address comprised in the mirror image rule is connected with the second access device; and
    determine that a mirror image rule comprising the IP address of the VM having been migrated is to be deleted from the first access device.

12. The device according to claim 10, wherein when determining that a mirror image rule on the first access device is to be deleted, the machine executable instructions further cause the processor to:
    receive a migration completion notification carrying address information of a VM having been migrated, an ID of a third access device connected with the VM having been migrated before the migration, and an ID of the second access device connected with the VM having been migrated after the migration;
    delete, a mirror image rule comprising a MAC address of the VM having been migrated and a VXLAN tunnel between the first access device and the third access device from a global mirror image rule configuration table in a case that the VM having been migrated is a database audit device, wherein a database server identified by an IP address comprised in the mirror image rule is connected with the first access device; and
    determine that a mirror image rule comprising the MAC address of the VM having been migrated and the VXLAN tunnel between the first access device and the third access device is to be deleted from the first access device.

* * * * *